United States Patent [19]

Wander et al.

[11] 3,885,057

[45] May 20, 1975

[54] PROCESS FOR STERILIZING A PRODUCT

[75] Inventors: Raoul Wander, Paris; Robert Angue, Antibes, both of France

[73] Assignee: Approvisionnement-Transport Aerien-Distribution, Paris, France

[22] Filed: Nov. 15, 1972

[21] Appl. No.: 306,522

Related U.S. Application Data

[60] Division of Ser. No. 93,015, Nov. 27, 1970, abandoned, which is a continuation-in-part of Ser. No. 718,044, April 2, 1968, abandoned.

[52] U.S. Cl. .................. 426/519; 426/521; 426/522
[51] Int. Cl. .......................... A23c 3/02; A23l 3/00
[58] Field of Search ............ 99/211, 212; 21/91, 60; 426/519, 521, 522

[56] References Cited
UNITED STATES PATENTS

| | | | |
|---|---|---|---|
| 1,693,034 | 11/1928 | Jensen | 99/212 |
| 2,674,697 | 4/1954 | Nicholson | 99/212 X |
| 2,685,522 | 8/1954 | Dunmire | 99/212 X |
| 3,054,684 | 9/1962 | Smith | 99/212 X |
| 3,058,833 | 10/1962 | Simonart | 99/212 |
| 3,072,491 | 1/1963 | Leviton et al | 99/212 |

*Primary Examiner*—Raymond N. Jones
*Assistant Examiner*—Ernest Therkorn
*Attorney, Agent, or Firm*—William D. Stokes

[57] ABSTRACT

A process and apparatus for sterilization of thermolabile materials, particularly lacteal, comprising simultaneously subjecting the material to induced internal heating effects and centrifugal force. The internal heating of the product is accomplished by friction arising between the product and a moving surface. The internal heating and centrifugal method and apparatus of the invention accomplishes sterilization of the product within a fraction of a tenth of a second. The temperature and the centrifugal force to which the product is subjected cooperate to destroy microorganisms that may be present, for example, by coagulating the protoplasm of these microorganisms, and by destroying, or at least degrading, the cell walls of the microorganisms.

3 Claims, 13 Drawing Figures

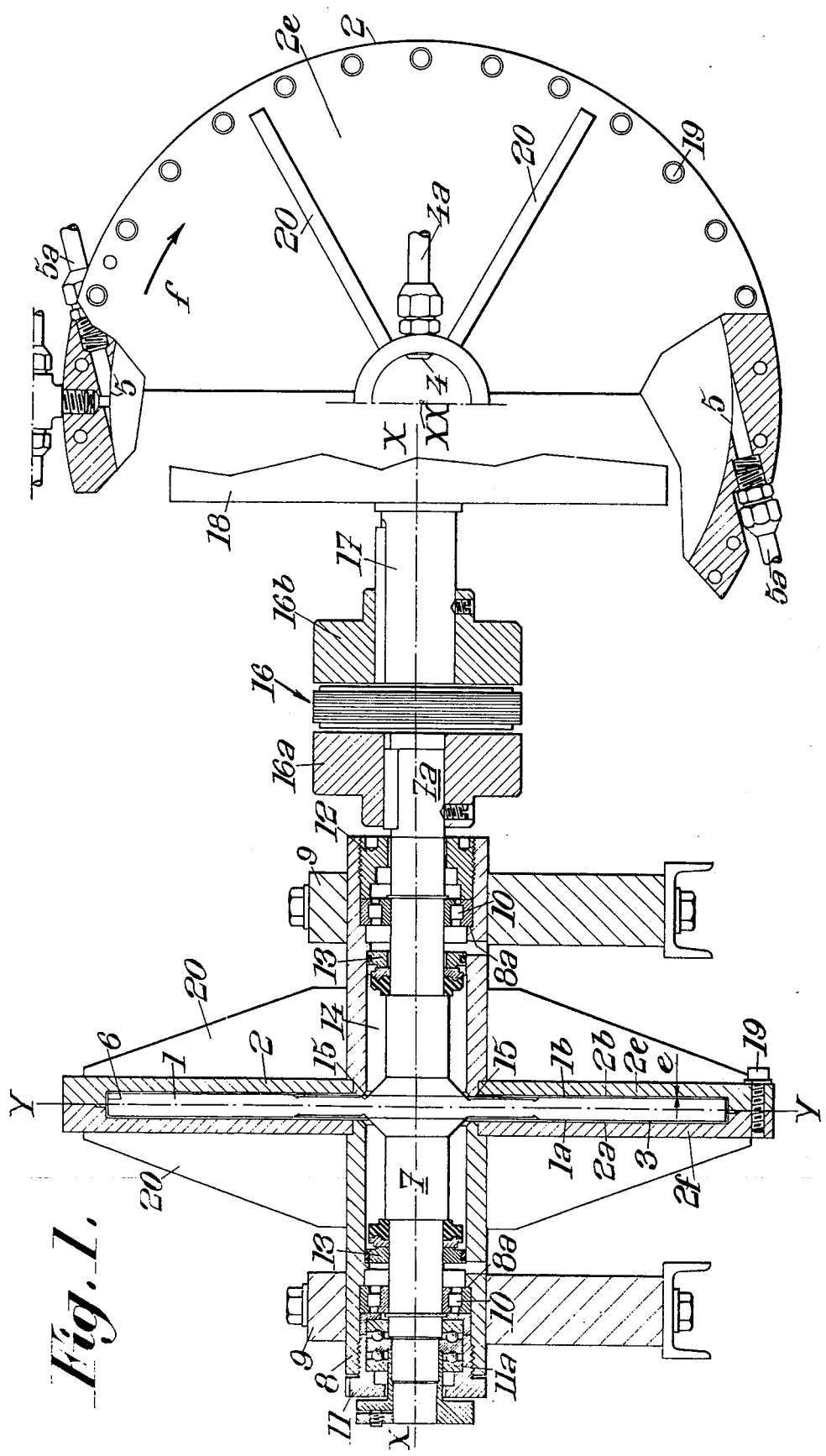

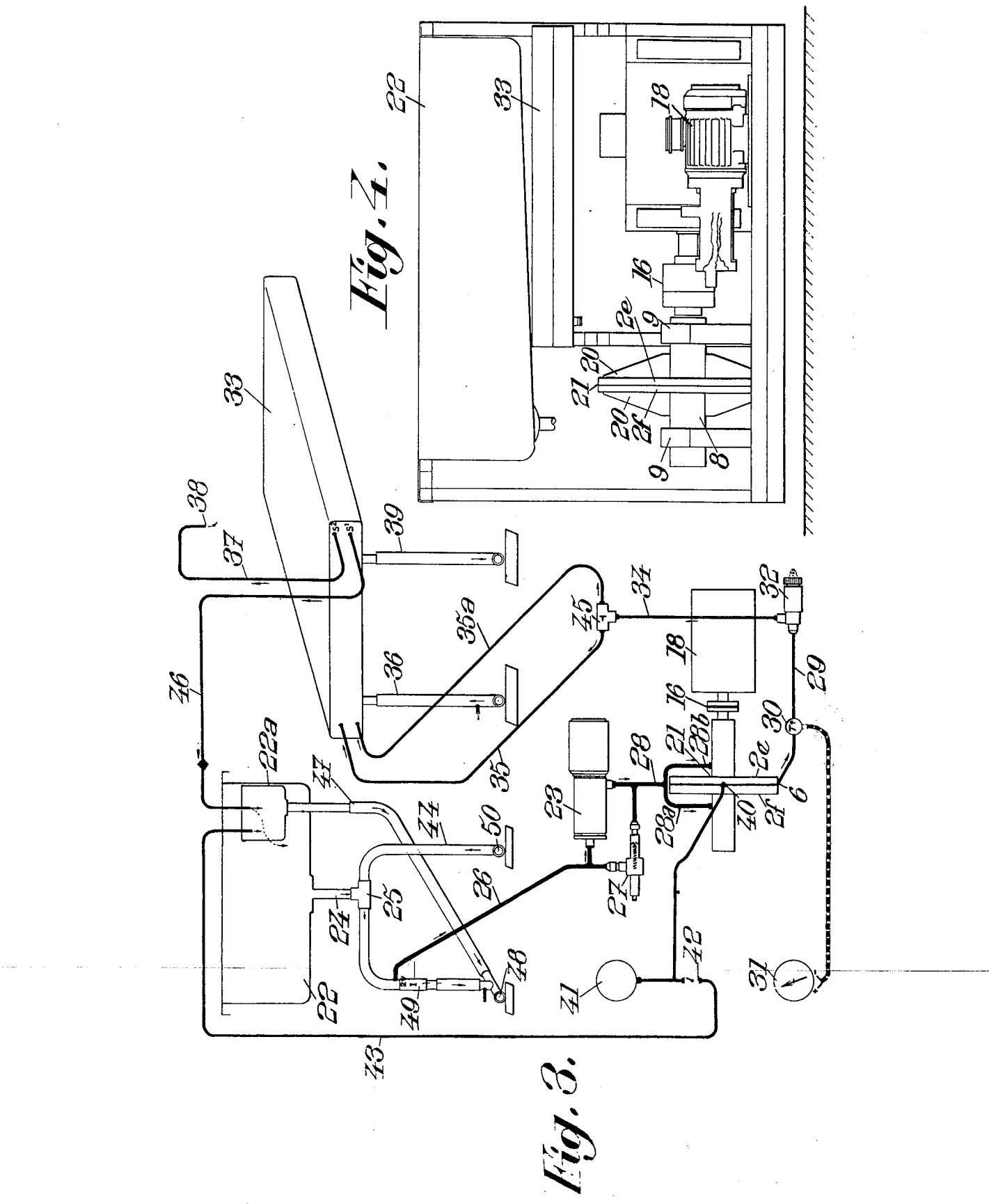

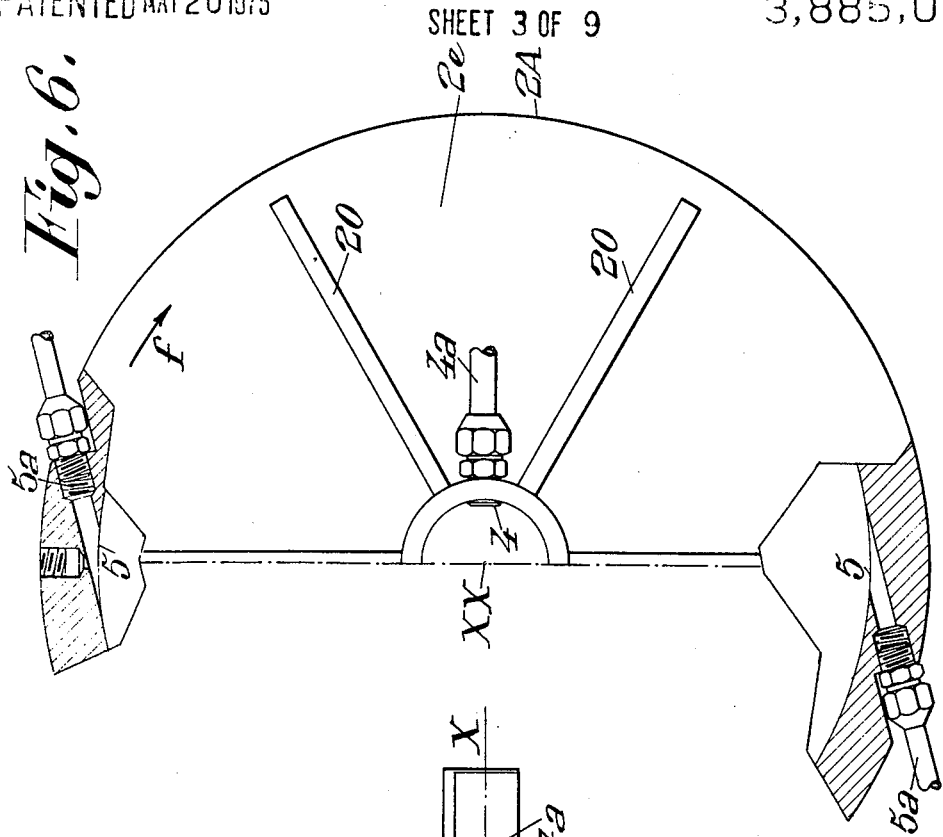
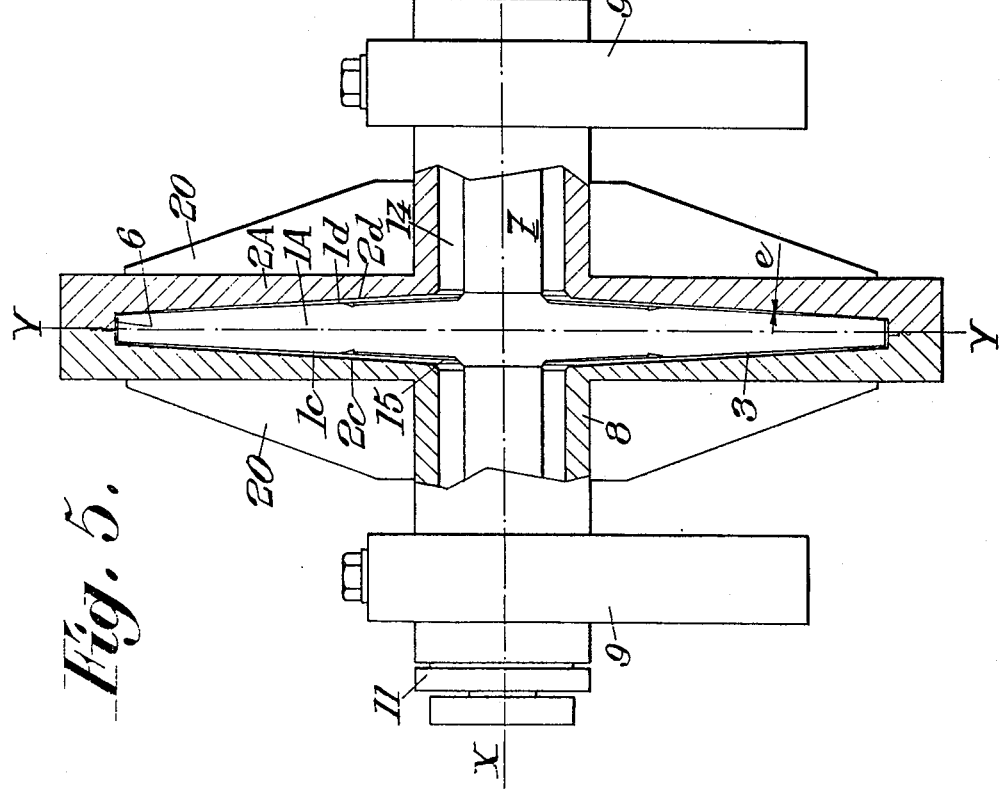

FLOW AS FUNCTION OF THE ROTATION SPEED

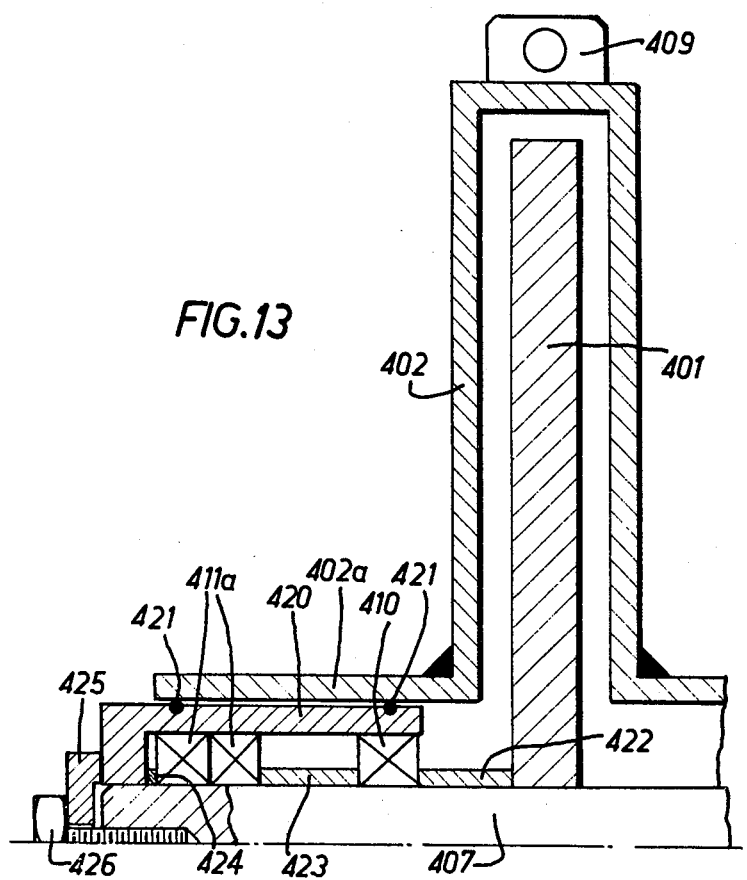

PROCESS FOR STERILIZING A PRODUCT

This application is a divisional application of Ser. No. 93,015, filed Nov. 27, 1970, now abandoned, which application was a continuation-in-part of application Ser. No. 718,044 filed Apr. 2, 1968, now abandoned.

The present invention relates to a process and apparatus for sterilization of liquids, in particular the sterilization of lacteal products, without application of external heat. More specifically, the present invention provides a simple and practical process and apparatus for sterilizing a liquid, particularly thermolabile substances which cannot be filtered such as lacteal products, plasma and similar biologic materials. The invention provides a process in which the material to be sterilized is simultaneously subjected to internal heating and a centrifugal force. More specifically, the invention is directed to a process for sterilizing a thermolabile product, which may contain pathogenic organisms, comprising the steps of subjecting the product simultaneously to an internal heating effect by friction against rotating, substantially planar, surfaces in relative movement with respect to the product to bring and maintain the product in liquid form, for at most a few tenths of a second, to a temperature which can assist in destroying any pathogenic organisms which may be present by coagulating the photoplasm of these oranisms, and to a centrifugal force adapted to assist in the destruction of the organisms by degrading the cell walls of the organisms.

The apparatus of the invention comprises at least one surface or wall moveable in relative movement to a stationary wall between which the product to be sterilized passes. The speeds of relative displacement of the wall or walls and the product are such that they assure, on the other hand, the raising of the product to the desired temperature, and on the other hand, the application of a centrifugal force to the particles of the product sufficient to degrade, and even destroy, the cell walls of the microorganisms that may be present in the product to be sterilized.

The apparatus of the invention comprises two members having cooperating opposed substantially planar surfaces spaced apart by less than 0.5 millimeter, inlet means for the charging of the product into the space between the opposed planar surfaced members, an outlet for the discharge of the product between the opposed planar surfaced members, and driving means to produce relative movement of the members at a speed high enough to (1), cause the product to heat to a sterilization temperature in the space and (2), apply a sufficient centrifugal force to maintain the product in liquid form under pressure in the space sufficient to degrade the cell walls of any organism present, but insufficient to cause thermal shock to the particular product even at sterilization temperatures. Utilizing the inventive method and apparatus, a sterilized product may be obtained which is substantially identical, with respect to its chemical and physical composition, to the initial product, but devoid of organisms.

In the commonly used processes and apparatuses for sterilizing thermolabile materials, the material to be sterilized is subjected to a specified temperature for a pre-determined time period by contacting the material with a heated wall or a hot vapor. By way of example, the sterilization of milk is commonly carried out in bulk at 130° to 150° C. While in the known processes milk is only held at those temperatures for a few tenths of seconds to a few seconds, this seemingly short duration results in deterioration of the organoleptic and nutritive value of the milk. Moreover, the apparatuses commonly used for sterilization have the additional disadvantage of subjecting the milk to a veritable thermal shock, brought about by the subjection of the milk to sudden contact with metal or vapor much hotter than itself resulting in chemical and physical degradation of the material. The chemical degradation more often results in a veritable "cracking" or "crusting" when particles of the product remain stuck to the heated wall of the apparatus while the undesired physical effects are the irreparable segregation or separation of the milk constituents, in particular the cream. In addition, the known methods result in a degree of segregation of the constituents, which often necessitates subsequent homogenization steps to provide a useful product. When vapor methods are used it is necessary to eliminate the water condensed in the product during the sterilization. A major disadvantage of these and other of the known methods, particularly vapor sterilization techniques, is that the laws of numerous countries do not permit their use.

In a practical sense, the only effect on the product brought about by utilizing the novel sterilization method and apparatus of this invention is the destruction of the microorganisms. The chemical and physical composition of the initial product are unchanged, due, in part, to the fact that the thermal treatment of the method is progressive and accomplished in a fraction of a second. In the conventional processes of sterilization by heating, the thermal effect is brutal, brought about, for the most part, by the relatively long duration and suddeness of the intense heating. The known deleterious effects of such methods are chemical degradation and physical segregation and are discussed hereinabove. The process according to the present invention provides all of the useful benefits of sterilization, while overcoming the disadvantages of degradation and segregation brought about in the known processes.

The tremendously unexpected improvements in sterilization brought about by the invention have been attributed in part to the fact that the centrifugal force applied have a disruptive effect on the cell walls of the microorganisms while internal heating kills the pathogenic organisms in a very short time. It is, of course, essential to the invention that the walls of the apparatus not be heated to a temperature greater than that of the liquid to be sterilized. This, so to speak, non-heating of the walls, prevents any thermal shock with consequent chemical degradation or physical segregation of the various constituents of the product to be sterilized. Utilizing the present invention, only the microorganisms, that may be present are destroyed, the destruction being total. It was also surprisingly discovered that the process of the invention permits sterilization of thermolabile liquids at lower temperatures and in a shorter time than in the processes heretofore known.

The invention will now be described by the following detailed descriptions in reference to preferred embodiments as illustrated in the accompanying drawings wherein:

FIG. 1 is a cross-sectional view of an embodiment of the invention having a rotatingly driven disc substantially planar with the interior walls of a fixed housing;

FIG. 2 is a fragmentary view, partly in section of FIG. 1 taken on the plane of line Y—Y;

FIG. 3 is a schematic illustration of a sterilizing system embodying the method and apparatus of the invention;

FIG. 4 shows in lateral elevation the disposition of a sterilizing apparatus of the type illustrated in FIGS. 1, 5 and 6 in the system of FIG. 3;

FIG. 5 is a longitudinal fragmentary view, partly in section, of another embodiment of the invention wherein the rotating disc member is outwardly tapered from its axis to its periphery;

FIG. 6 is a fragmentary view, partly in section, of FIG. 5 taken along line Y—Y;

FIG. 13 is a fragmentary view in section of another embodiment of the invention having a rotatingly driven disc substantially planar with the interior walls of a housing.

Figure 7:
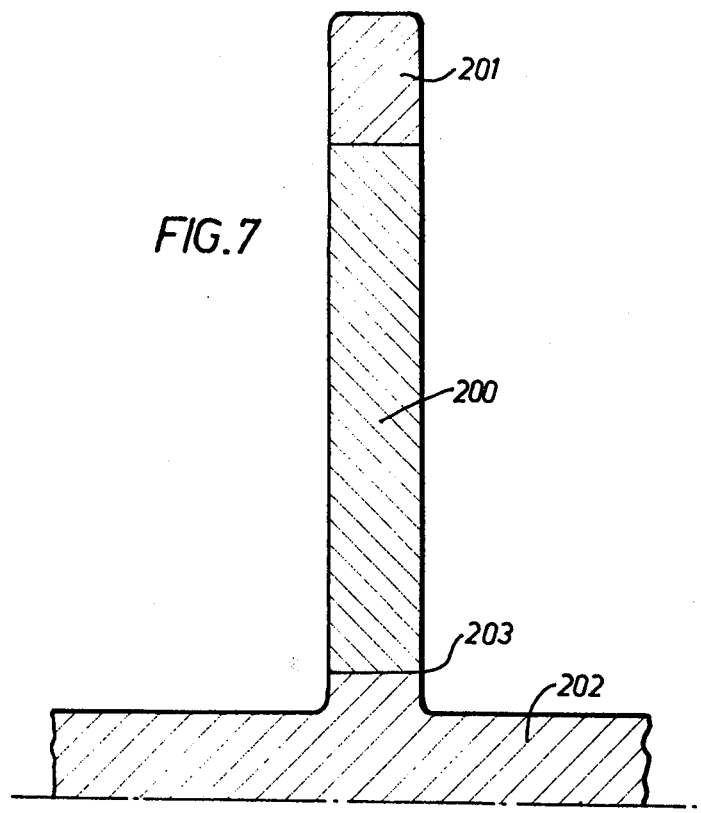
FIG. 7 illustrates the construction of a preferred rotating disc embodiment of the invention.

Referring to FIGS. 1 and 2, there is shown a device of the invention comprising a flat disc 1 mounted on shaft 7. Disc 1 is adapted to be rotatingly driven in the direction of the arrow $f$, about its axis XX at the interior of a housing or casing 2. The internal walls of casing 2 (2a and 2b) are substantially coplanar with the respectively moveable faces 1a and 1b of disc 1. The distance $e$ between each moveable face 1a and 1b of the disc 1 and the corresponding, opposed fixed face 2a and 2b of the casing is less than 0.5. This space is indicated by numeral 3. The product to be sterilized, for example milk, is flowed into the space 3 at inlet 4 in the region of the axis of rotation XX of disc 1 (see also FIG. 3). The sterilized product passes out of the device at outlets 5 in the region of the periphery 6 of disc 1 (see also FIG. 3). The centrifugal force acts on the product from the center (axis XX) towards the periphery 6 of the disc 1. The internal heating of the product is brought about solely by the friction of the particles of this product on the faces 1a and 1b of the disc 1 and on the fixed faces 2a and 2b of the housing 2 with respect to which the product is displaced at high speed.

In the embodiment illustrated in FIGS. 1 and 2, the flat disc 1 (having a plane of symmetry YY) is carried by a shaft 7 housed in a sleeve 8 itself carried by blocks 9. Shaft 7 rotates at the interior of the sleeve 8 due to roller bearings 10 which are maintained in position against internal shoulders 8a of the sleeve 8 by means of threaded plugs 11 and 12 fitted into the two ends of the sleeve 8. Shaft 7 passes through these two plugs which plug 11 also supports a bearing 11a. Two packings 13 assure a leak proof connection at the two ends of the chamber 14 located between the central parts of the shaft 7 and of the sleeve 8. Chamber 14 communicates with space 3 through the annular passages 15 and inlet 4. In this manner, the supply of the product prior to sterilization may be utilized in chamber 14 to cool the shaft 7 somewhat while warming the product. On one end 7a of the shaft 7, which passes through the corresponding plug 12, is mounted on one of the halves 16a of a coupling 16 whose other half 16b is fixed to the shaft 17 of an electric motor 18.

In FIG. 2, one of the walls 2e forming casing 2 can be seen in a more precise manner. The wall 2e is fixed to the other wall 2f (FIG. 1) by means of pins 19, and both the walls 2e and $f$ have reinforcing ribs 20. Still referring to FIG. 2, there can be seen the inlet 4a for the product to be sterilized opening out at the point 4, and the outlet tubes 5a opening out at the points 5 for the discharge of the sterilized product.

FIGS. 5 and 6 illustrate an embodiment of the invention where the rotatable disc 1A is tapered from its axis to its peripheral edge. Thus the faces 1c and 1d of the disc 1A are slightly inclined to the plane of symmetry YY of the disc instead of being parallel to this plane, as in the embodiment of FIG. 1. It is the same for the faces 2c and 2d of the casing 2A which are opposed to the faces 1c and 1d. In the embodiment of FIGS. 5 and 6, as in other embodiments of this invention, the spacing $e$ between the opposed walls 1c–2c on the one hand, and 1d–2d on the other hand, which delimit the space 3, is 0.5 mm or less. Excellent results have been achieved where the distance $e$ between the faces of the rotating disc and the opposed fixed interior wall is of the order of about 0.2 to 0.3 millimeter.

When the product to be sterilized is milk, the temperature is raised to about 135° to 145°C. within a fraction of a tenth of a second and is held at the maximum temperature for only a few tenths of a second. The maximum speed of relative displacement when sterilizing milk (in the neighborhood of the periphery of the disc) is greater than 50 meters per second and preferably of the order of 60 to 80 meters per second.

It was discovered that utilizing the method of the invention, milk remains absolutely stable in the course of the sterilization treatment, even where the milk has an excess of albumen, calcium and/or acidity. Of particular importance is the fact that no coagulation manifests itself in the course of the treatment to the end that the sterilized product remains a complete food with all the nutritive value of the original milk, that is, without loss of vitamins, thiamine, lysine and other amino-acids. Moreover, the digestability of the protein of the milk is not altered by the sterilization treatment.

In FIG. 3, a sterilization system in accordance with the invention is illustrated. The illustrated system incorporates a device, indicated by numeral 21, such as shown in FIGS. 1, 2, 5, 6 and 12, driven by the motor 18 through the coupling 16. In the system, a vat 22 is provided for receiving the product to be sterilized. A drain chamber 22a is provided in vat 22. A pump 23 is provided which is adapted to pump the product to be sterilized from the vat 22 through pipe 24, three-way valve 25 and into conduit 26. By-pass valve 27 is disposed in parallel with the pump 23. The parallel unit 23–27 supplied by conduit 26 discharges into conduit 28 which supplies, by its branches 28a and 28b in parallel, the sterilizing apparatus 21.

An outlet conduit 29 is provided for the sterilized product which exists at the periphery 6 of the rotating disc (through the tubes 5a shown in FIG. 2 and FIG. 6). Conduit 29 is provided with a temperature sensor means 30 that is cooperatively connected with a thermometer means for indicating the temperature. A regulator valve means 32, which can be controlled by, for example, a pneumatic means (not shown) is provided to insure a weight of flow such that the sterilized liquid reaches the desired temperature. In the illustrated embodiment, this is achieved by sensor means 30.

A two-zone heat exchanger 33 is connected to receive the sterilized product through the conduits 34 and 35 and cooling water through conduit 36. The sterilized product, which exits through the conduit 37 and is taken off at discharge outlet 38. The water, which is heated by the exchange of heat with the sterilized product, is discharged through pipe 39. A pressure sensor means 40 is provided and operatively connected with means 41 for indicating the pressure at the interior of the unit 21. Valve means 42 is provided for initially purging the air at the interior of the unit 21. The purged products are returned through the conduit 43 into section 22a of the vat 22. In the illustrated system a water circulation system is provided for testing the sterilization apparatus or for putting this apparatus under load. This water circulation system comprises an inlet 50 and conduit 44. The water flows through valve 25 into conduit 26. A conduit 35a is also provided that can be alternated with conduit 35 by three-way valve 45. Where the alternate conduit 35a is used, the discharge from the exchanger 33 is made through the conduit 46 towards emptying section 22a, emptying pipe 47, thence to discharge outlet 48. Outlet 48 may also be supplied through the valve 25 from conduit pipe 49.

In operation, water is pumped into the system at inlet 20. The water flows through valve 25 towards conduit 26. Pump 23 pumps the water into conduits 28, 28a and 28b and, from there, into chamber 14 of the unit 21. The friction created by the product movement with respect to planar surfaces in unit 21 heats the water which is then evacuated through the conduits 29, 34 and 25a. The water may be in the liquid or vapor state according to the adjustment temperature. In the exchanger 33 the heated water is cooled by contact with cold water arriving through the pipe 36. The water, thus cooled, exists through conduit 46, and from there, it flows through pipe 47 to discharge outlet 48.

When the apparatus has been thusly started and adjusted, the position of valves 25 and 45 is modified (after the flow of water to inlet 50 has been cut off) to effect flow of the product in vat 22 through the conduits 24 and 26, pump 23 and conduits 28, 28a and 28b into sterilizing unit 21. The sterilized product is discharged at the periphery 6 of unit 21. The sterilized product flows through conduits 29, 34 and 25 to exchanger 33, where it is cooled before being discharged through the conduit 37 and outlet 38.

In FIG. 4, there is shown an enlarged schematic illustration showing vat 22, two-zone exchanger 33 (one zone being for the treated product and the other zone for the test water), sterilizing unit 21, coupling 16 and motor 18 of FIG. 3.

Figure 12:
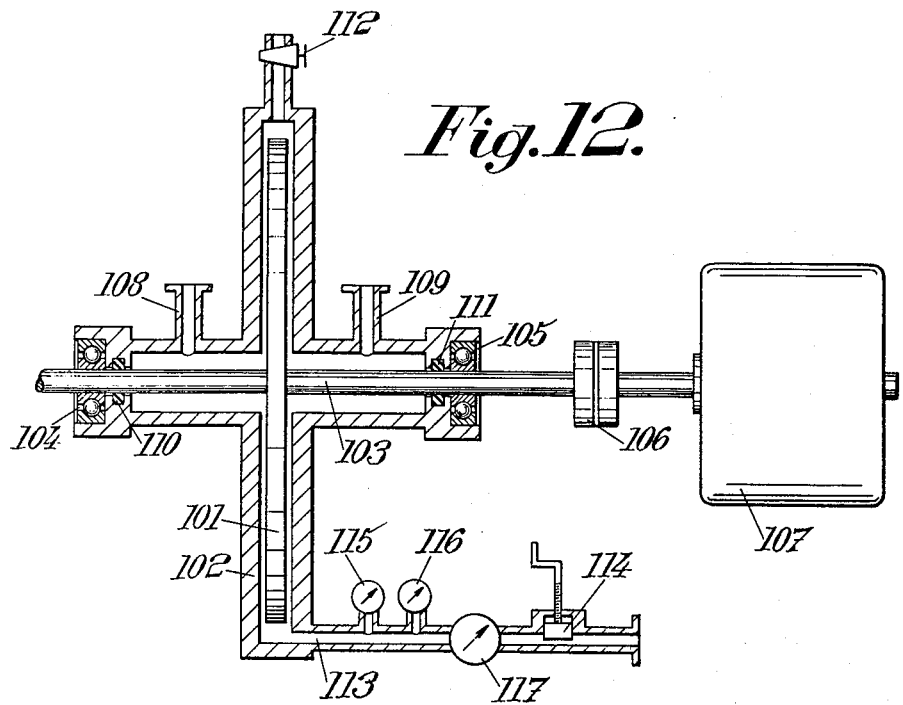
FIG. 12 is a view partly in section, of another embodiment of the invention utilizing a flat rotating disc.

In the preferred embodiment, Disc 1, shown in FIGS. 1 and 2, disc 1A in FIGS. 5 and 6, disc 101 in FIG. 12, and disc 401 in FIG. 13, are constructed in such manner that the opposed planar surfaces of the apparatus will not seize during operation, no matter what product is being sterilized in the unit. Seizing between the planar surfaces may be avoided in numerous ways, e.g., careful selection of the construction material in accordance with the temperature needed to sterilize the material being handled, and/or careful control of the dimensions of the disc. This latter control will eliminate any possibility of undulations during the high speed rotations. In the preferred embodiment of the invention, the discs are constructed as shown in FIG. 7. It was discovered that such construction completely eliminated seizing brought about by high peripheral sterilizing temperatures, and undulations particularly where large diameter discs are required in high capacity plants. It was discovered that seizing may be simply overcome by providing an annular collar or ferrule 201 around the disc 200.

By way of example of such construction, a disc was manufactured 15mm thick having external radius of 130mm. The disc was mounted on and driven by a shaft 202, 40mm in diameter. The disc was welded to the shaft at weldpoint 203. The disc and shaft were of nickel-chromium-molybdenum steel having a 3% copper content, which construction provided, upon heating, a yield strength of 150 kg/mm$^2$. A ferrule or collar 201 of the same metal 15mm thick (same thickness as the disc), with a radial diameter of 20mm was heat shrunk on disc 200. The free edges of ferrule 201 were rounded. The dimensions of the ferrule are such that: the diameter of the inner cylindrical area = diameter of disc $- (E_1 + E_2)$, where E, corresponds to the thickness of the disc at the temperature of greatest expansion of the metal during any sterilization operation and $E_2$ corresponds to the adequate metal thickness for developing, at sterilization temperature, a slight flexible stress maintaining the ferrule in place. Collar 201 may be fixed in place by numerous methods, for example, force fitting, and shrink fitting. In the preferred embodiment, the ferrule is mechanically joined to the disc by force fitting and welded together by electron bombardment.

Figure 8:
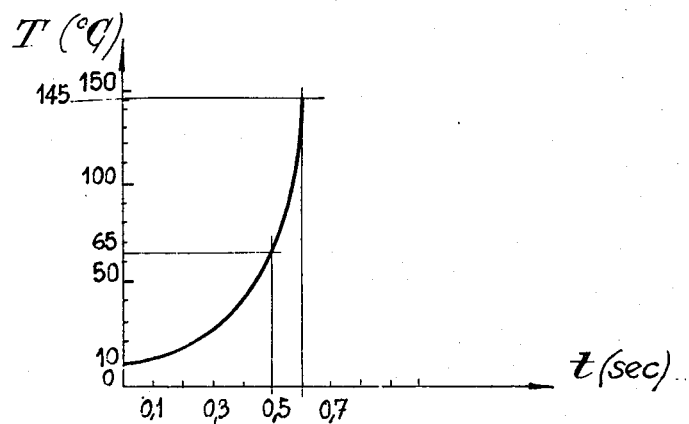
FIG. 8 shows a curve illustrating the rise of temperature (given on the ordinate in degrees C) as a function of the time (given on the abscissa in tenths of a second) in a sterilization apparatus, of the disc type of the invention.

FIG. 8 illustrates the evolution of the temperature as a function of the time in a product sterilized in a device of the type illustrated in FIGS. 1–2, 5–6 or 7. Assuming that the product arrives cold at a temperature of 10° C., it is seen that at the outlet, at the end of 0.6 second, the temperature reaches 145° C., the product being heated progressively without ever being in contact with a wall hotter than itself. This lack of contact with bodies hotter than itself avoids any thermal shock. It will also be noted that the temperature of the product is raised from about 65° C. to about 145° C. in less than a tenth of a second. Consequently the product remains only a fraction of a second at temperatures which could, if held at such temperature for any greater time period, bring about the degradation in the chemical and physical structure of its components. Utilizing the inventive method, cooling of the product commences immediately after the vary transient temperature maxima is reached. It is to be understood, in the case of lacteal products, that it is important to cool the sterilized product rapidly as it exists from the inventive device in order to avoid holding the product at 145° C. after its outlet from the device.

Figure 9:
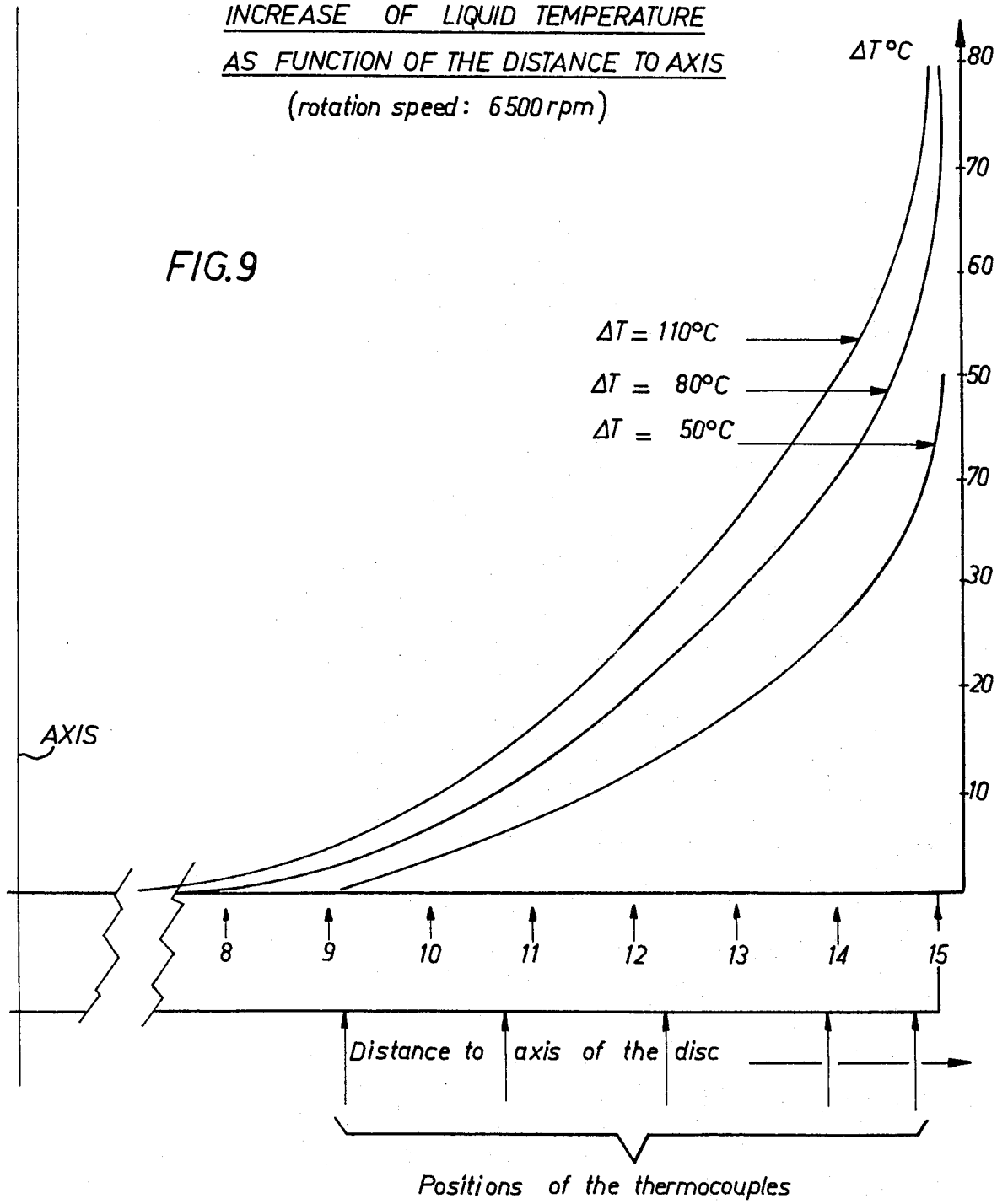
FIG. 9 is a graph illustrating the increase of liquid temperature as a function of the distance to the axis of the disc type embodiment of the invention.
Figure 10:
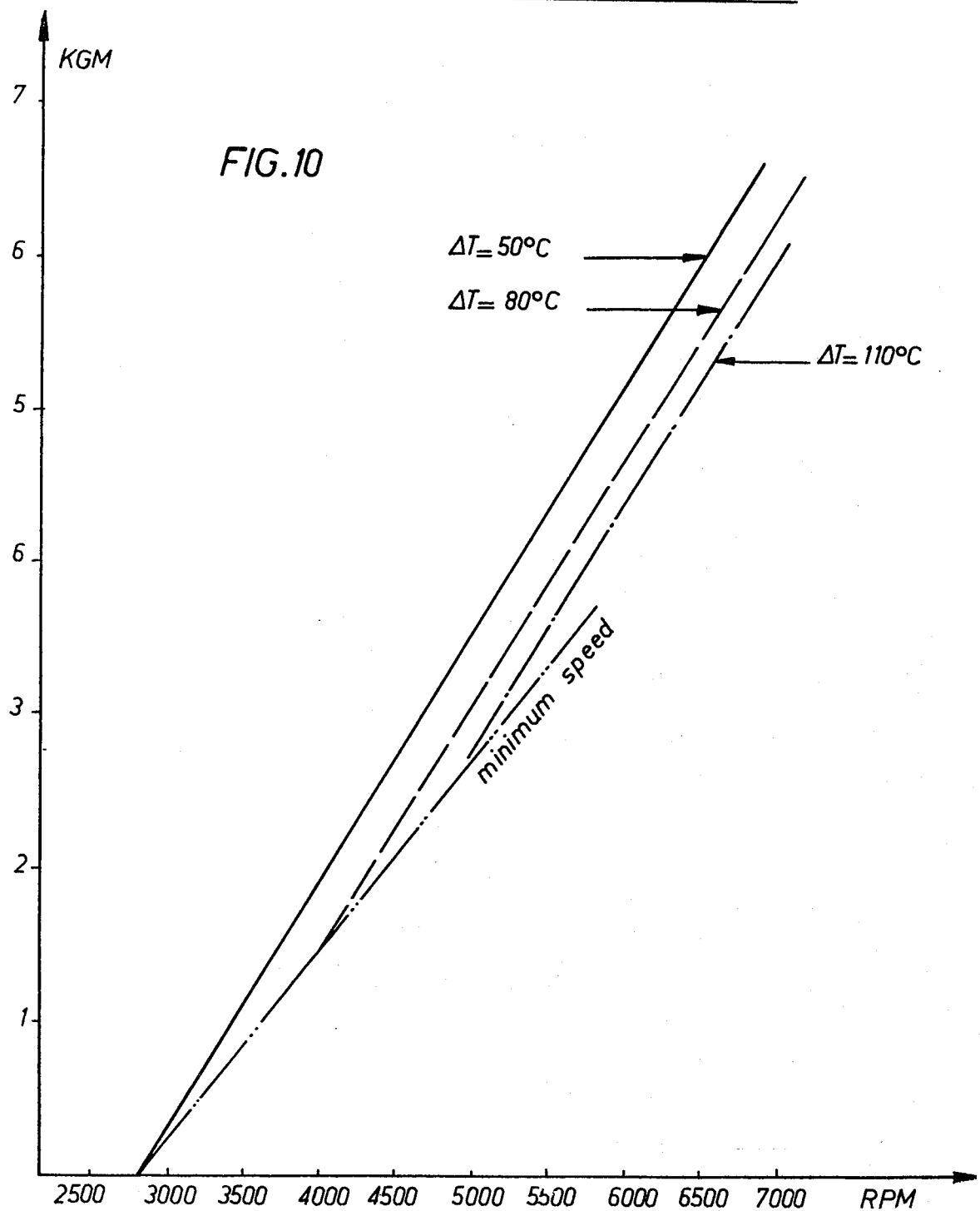
FIG. 10 is a graph illustrating the driving couple absorbed by a rotating disc of the invention.
Figure 11:
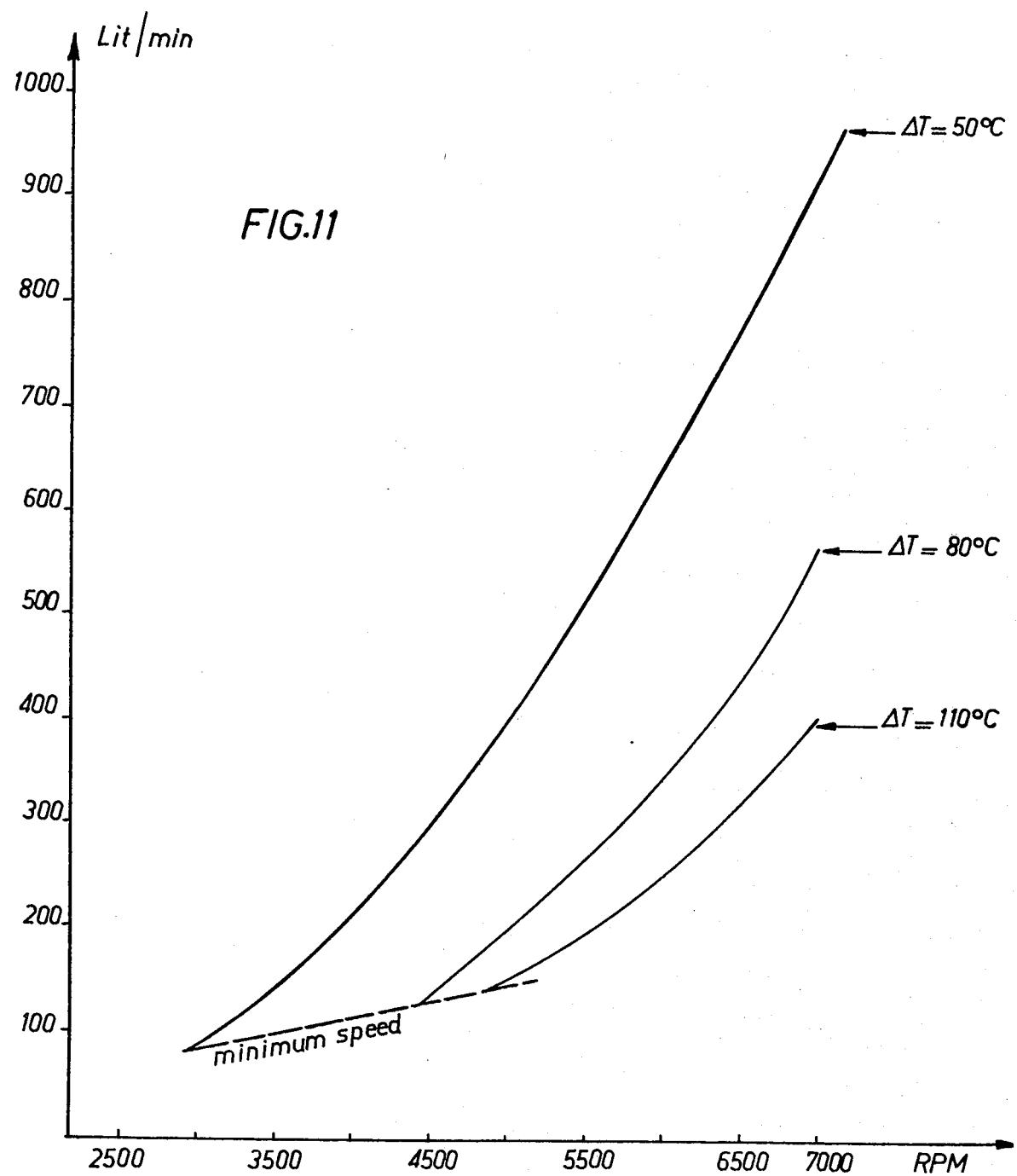
FIG. 11 is a graph illustrating flow as a function of the rotation speed in a sterilizing apparatus of the invention.

An apparatus was constructed incorporating the rotating disc embodiment of FIGS. 1 and 2 and tested in the sterilization of milk. Thermocouples were placed on the walls of the disc along its radius. In operation, the temperature at the point of each thermocouple was noted in accordance with its position on the disc for a given speed of rotation. The speed of rotation was varied during the tests. FIGS. 9, 10 and 11 illustrate the summary of the results of the runs. Referring to FIG. 9 it will be observed that the temperature increase of the milk treated was only noticeable after a certain distance from the axis, that is, a minimum peripheric speed exists in order to obtain a given temperature increase between the entrance and the exit. It will also be noted that the temperature increase, $\Delta T$, is perceptibly proportional to $(x-x_0)^4$, in which $x$ represents the abcisse on a radius of the disc and $x_0$ the abcisse, on a radius of the disc, of the disc point where the minimum peripheric speed, as mentioned above, is obtained.

FIGS. 10 and 11 illustrate respectively, the driving couple absorbed by the disc and flow as a function of the rotation speed. Utilizing speeds varying from 2500 rpm to 7000 rpm, the driving couple absorbed by the disc was measured. The differences in temperature, $\Delta T$, between the inlet and outlet of the disc were 50°, 80°, and 110° C. It will be observed from the graphs that the variation of the couple is a linear function of the driving speed of the disc. It may also be observed that the driving couple is measurably independent of the differences of temperature between the entrance and the exit of the milk since the graphs corresponding to a$\Delta T$ of respectively 50°, 80° and 110° C. are very close, accordingly, the couple is measurably independent of the flow of fluid through the device. This is so since, when the speed of rotation is varied, the maintenance of constant differences in temperature is obtained by a correlative variation of the flow treated in the device.

It will also be observed from the graphs of FIGS. 9, 10 and 11 that there is a minimum speed of rotation below which it is impossible to obtain a given temperature increase.

FIG. 12 is a sectional view of another embodiment of a flat disc sterilizer device of this invention. In this embodiment the liquid to be sterilized flows into the sterilizer through conduits 108 and 109. The sterilizer unit comprises a disc 101 mounted rotatably in housing 102. Disc 101 is rigidly mounted on shaft 103. The ends of shaft 103 are journaled through housing 102 by means of, respectively, bearings 104 and 105 and packings 110 and 111. Shaft 103 is driven, through the intermediary of a coupling 106, by means of motor 107. The liquid introduced, either by gravity or by means of a pump, through conduits 108 and 109 flows into the housing adjacent to the shaft 103 on either side of disc 101.

Any air in the installation at commencement of operation is removed by means of a purging valve 112. When the device is in operation the liquid passes between the planar surfaces formed by rotary disc 101 and the inner surfaces of housing 102 adjacent to the disc member and brought to the sterilizing temperature by friction. The effects of centrifugal force degrades the cellular walls of any microorganisms present and causes the liquid to be driven towards the periphery of the disc and thence through outlet conduit 113 provided with a flow regulator device 114. Instruments for measuring the temperature pressure 116 and its rate of flow may be provided as illustrated by means 115, 116 and 177 respectively.

It may be appreciated that the sterilizing temperature may be readily controlled either by varying the speed of rotation of the disc or by varying the rate of flow of the liquid. Utilizing the apparatus just described in which the disc had a diameter of 400 millimeters and a thickness of 15 millimeters, positioned at 0.3 millimeters from the walls and driven at 3,000 revolutions per minute, the temperature reached a maximum of 145° C. for a flow rate of 120 litres/hour.

Summarized in Table I are comparative analyses of some bacteriological counts in cream before and after sterilization utilizing the method and apparatus comprising the rotating disc unit of this invention heretofore described.

TABLE I

BEFORE STERILIZATION
Cream A

1. Count of thermoresistant anaerobic bacteria (sporulated) after 30 minutes of heating at 80° C. in a medium of deep gelose VF in tubes:
    After 7 days at 37° C.:     more than 10,000 organisms/1 cm³.
2. Count of thermoresistant aerobic bacteria (sporulated) after 30 minutes of heating at 80° C. in a medium of nutritious gelose in Petri boxes:
    After 3 days at 37° C.:     75,000 organisms/1 cm³.
3. All germs using the two layer method in a medium of tryptone Agar medium in Petri boxes (Buttiaux):
    After 3 days at 30° C.:     more than 10,000,000 organisms/1 cm³.
    After 3 days at 6° C.:     1,800,000 organisms/1 cm³.
4. Coliform germs on green brilliant broth counted after incubating 48 hours at 30° C.:
    more than 1,000 organisms/1 cm³.
5. Escherichia coli (Mackenzie test) counted after 48 hours at 48 hours at 44° C., on green brilliant broth and peptoned water:
    more than 1,000 organisms/1 cm³.
6. Pathogenic staphylococcus on Chapman medium:
    no organisms.
7. Salmonella and Shigella research:
    no organisms.

AFTER STERILIZATION
Cream B

1. Count of thermoresistant anaerobic bacteria (sporulated) after 30 minutes of heating at 80° C. deep in a medium of gelose VF in tubes:
    After 7 days at 37° C.:     no organisms.
2. Count of thermoresistant aerobic bacteria (sporulated) after 30 minutes of heating at 80° C. in a medium of nutritious gelose in Petri boxes:
    After 7 days at 37° C.:     no organisms.
3. Count of all germs using the two layer method in a medium of tryptone Agar in Petri boxes (Buttiaux):
    After 3 days at 30° C.:     no organisms.
    After 3 days at 6° C.:     no organisms.
4. Coliform germs on green brilliant broth counted after incubating 48 hours at 30° C.:
    no organisms.
5. Escherichia coli (Mackenzie test) counted after incubating 48 hours at 44° on green brilliant broth and peptoned water:
    no organisms.
6. Pathogenic staphylococcus on Chapman medium:
    no organisms.
7. Salmonella and Shigella research:
    no organisms.

In another preferred embodiment of the invention, particularly where the product to be sterilized requires higher temperatures, e.g. 140° C. and above, the sterilization apparatus of the invention is constructed as shown in FIG. 13. In FIG. 13, member disc member 401 is shown contained in housing member 402 and rotatably mounted on shaft 407. A clamping means 409 is provided for attaching the housing 402 to a base member (not shown). In this embodiment, housing member 402 is provided laterally extending sleeve members 402a. A sealing unit comprising a cylindrical telescoping member 420, cap member 425 and screw member 426 is provided. Cylindrical member 420 is slidably mounted within sleeve members 402a of housing 402 and sealingly engaged therewith by means of O rings 421 in such manner that the cylindrical member 420, hence shaft 407 and disc member 401 are freely slidable within housing 402 during operation. As shown in the illustrated embodiment, screw member 426 is journaled through cap member 425 and threadedly engaged with the end of shaft 407. Shaft 407 is journaled within cylindrical cap member 420 by means of roller bearing means 410 and ball-thrust bearing means 411a. Spacers 422, 423 and 424 are provided to hold the capping members 420, 425 and 426, bearings 410 and 411a, shaft 407 and disc member 401 in strict alignment. The shaft mounting is the same for both shaft ends.

It will be appreciated from a reading of the foregoing specification that the invention provides a simple and practical process and apparatus that achieves complete sterilization of thermolabile substances without chemical modification of the substance, alteration of color or organoleptic qualities, undesired physical changes.

Although the present invention has been described with specific reference to particular embodiments, the invention is not limited thereto, as there could be various modifications made without departing from the spirit of scope of this invention.

We claim:

1. A process of sterilizing a product in liquid form which may contain microorganisms consisting essentially of subjecting said product simultaneously to internal heat generated within the product by internal friction brought about between rotating substantially planar surfaces in relative movement with respect to said product thereby elevating and maintaining said product, for a few tenths of a second, to a temperature sufficient to destroy microorganisms which may be present in said product by coagulating the protoplasm of the microorganisms; and to a centrifugal force sufficient to destroy said microorganisms by degrading the cell walls of said microorganisms; and to pressure sufficient to prevent thermal shock even at said temperature; whereby said temperature and said centrifugal force pressure possess combined effects sufficient to destroy any microorganisms present to yield a sterilized product with substantially no chemical degradation of physical segregation of the product.

2. A process according to claim 1 in which said product is a lacteal product.

3. A process according to claim 2 of sterilizing said lacteal product in which said generated is in the range 135° C. to 145° C.

* * * * *

UNITED STATES PATENT OFFICE
CERTIFICATE OF CORRECTION

Patent No. 3,885,057　　　　　　　　　　　Dated May 20, 1975

Inventor(s) Raoul Wander and Robert Angue

It is certified that error appears in the above-identified patent and that said Letters Patent are hereby corrected as shown below:

Col. 7, line 65, "177" should be --117--.

Col. 10, claim 1, line 19, "of" should be --or--.

Col. 10, claim 3, line 24, after "said" insert --temperature--.

Signed and Sealed this fifth Day of August 1975

[SEAL]

Attest:

RUTH C. MASON
*Attesting Officer*

C. MARSHALL DANN
*Commissioner of Patents and Trademarks*